United States Patent
Stanis et al.

(10) Patent No.: US 8,122,018 B2
(45) Date of Patent: Feb. 21, 2012

(54) SYSTEM AND METHOD FOR GENERATING CREATIVES

(75) Inventors: Thomas Stanis, Van Nuys, CA (US); David Gehrking, Encino, CA (US); Ariel Bardin, Belmont, CA (US)

(73) Assignee: Google Inc., Mountain View, CA (US)

( * ) Notice: Subject to any disclaimer, the term of this patent is extended or adjusted under 35 U.S.C. 154(b) by 163 days.

(21) Appl. No.: 11/463,454

(22) Filed: Aug. 9, 2006

(65) Prior Publication Data
US 2008/0040318 A1 Feb. 14, 2008

(51) Int. Cl.
G06F 7/00 (2006.01)
G06F 17/30 (2006.01)

(52) U.S. Cl. .................. 707/727; 705/14.72
(58) Field of Classification Search ............ 707/1, 727
See application file for complete search history.

(56) References Cited

U.S. PATENT DOCUMENTS

| | | | |
|---|---|---|---|
| 5,724,521 A | 3/1998 | Dedrick | 395/226 |
| 5,740,549 A | 4/1998 | Reilly et al. | 705/14 |
| 5,848,397 A | 12/1998 | Marsh et al. | 705/14 |
| 5,948,061 A | 9/1999 | Merriman | 709/219 |
| 5,999,912 A | 12/1999 | Wodarz | |
| 6,003,007 A | 12/1999 | DiRienzo | |
| 6,026,368 A | 2/2000 | Brown et al. | 705/14 |
| 6,044,376 A | 3/2000 | Kurtzman, II | 707/102 |
| 6,078,914 A | 6/2000 | Redfern | 707/3 |
| 6,144,944 A | 11/2000 | Kurtzman, II et al. | 705/14 |
| 6,167,382 A | 12/2000 | Sparks et al. | 705/26 |
| 6,269,361 B1 | 7/2001 | Davis et al. | 707/3 |
| 6,285,999 B1 | 9/2001 | Page | |
| 6,401,075 B1 | 6/2002 | Mason et al. | 705/14 |
| 6,985,882 B1 | 1/2006 | Del Sesto | 705/37 |
| 7,039,599 B2 | 5/2006 | Merriman | 705/14 |
| 7,136,875 B2 | 11/2006 | Anderson et al. | 707/104.1 |
| 7,268,896 B2 * | 9/2007 | Bellagamba et al. | 358/1.12 |
| 7,778,874 B1 * | 8/2010 | Saunders | 705/14.67 |
| 2002/0078158 A1 * | 6/2002 | Brown et al. | 709/206 |
| 2002/0087352 A1 * | 7/2002 | Armstrong et al. | 705/1 |
| 2005/0027594 A1 * | 2/2005 | Yasnovsky et al. | 705/14 |
| 2005/0065806 A1 * | 3/2005 | Harik | 705/1 |
| 2005/0080668 A1 * | 4/2005 | Rothman et al. | 705/14 |
| 2005/0086612 A1 * | 4/2005 | Gettman et al. | 715/848 |
| 2005/0149396 A1 * | 7/2005 | Horowitz et al. | 705/14 |
| 2005/0268216 A1 | 12/2005 | Hayes et al. | |
| 2006/0242013 A1 | 10/2006 | Agarwal et al. | |

(Continued)

FOREIGN PATENT DOCUMENTS

KR 20000063480 A 11/2000
(Continued)

OTHER PUBLICATIONS

95/001,073, Reexamination of Stone et al., filed Sep. 30, 2004.
(Continued)

Primary Examiner — Angela Lie
Assistant Examiner — Kris Mackes
(74) Attorney, Agent, or Firm — Fish & Richardson P.C.

(57) ABSTRACT

Attribute data regarding an entity, such as a business entity, are identified. Thereafter, one or more creative templates are selected based on the attribute data related to the entity. Creatives for the entity are then generated from the creative templates and the entity attribute data.

29 Claims, 5 Drawing Sheets

U.S. PATENT DOCUMENTS

| | | | |
|---|---|---|---|
| 2006/0242147 | A1 | 10/2006 | Gehrking et al. |
| 2007/0022003 | A1* | 1/2007 | Chao et al. ............. 705/14 |
| 2007/0027901 | A1* | 2/2007 | Chan et al. ............. 707/102 |
| 2007/0208751 | A1 | 9/2007 | Cowan et al. |
| 2007/0233558 | A1* | 10/2007 | Jones et al. ............. 705/14 |
| 2007/0233566 | A1 | 10/2007 | Zlotin et al. |
| 2008/0249853 | A1 | 10/2008 | Dekel et al. |
| 2009/0070230 | A1* | 3/2009 | Silverstein et al. ........ 705/26 |

FOREIGN PATENT DOCUMENTS

| | | |
|---|---|---|
| KR | 20010087545 A | 9/2001 |
| KR | 20020004093 A | 1/2002 |
| WO | WO 97/21183 | 6/1997 |

OTHER PUBLICATIONS

95/001,061, Reexamination of Stone et al., filed Sep. 3, 2002.
95/001,073, Reexamination of Dean et al., filed Jul. 11, 2002.
95/001,068, Reexamination of Stone et al., filed Dec. 7, 2002.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Patent No. 7,240,025 B2, Control No. 95/001,073, Jul. 30, 2008.
Request for Reexamination of U.S. Patent No. 6,446,045 B1, Control No. 95/001,061, Jul. 7, 2008.
Request for Reexamination of U.S. Patent No. 7,249,059 B2, Control No. 95/001,069, Jul. 21, 2008.
Request for Reexamination of U.S. Patent No. 6,829,587 B2, Control No. 95/001,068, Jul. 14, 2008.
Brin, S., et al., "The Anatomy of a Large-Scale Hypertextual Search Engine", Seventh International World Wide Web Conference, Brisbane, Australia, 20 pages.
U.S. Provisional Patent Application for Zlotin, et al., U.S. Appl. No. 60/778,594, filed Mar. 1, 2006, 56 pages.
U.S. Provisional Patent Application for Cowan, et al., U.S. Appl. No. 60/739,580, filed Nov. 22, 2005, 11 pages.
Authorized officer So Young Doo, International Search Report and Written Opinion in PCT/US2007/075618, mailed Jan. 9, 2008, 10 pages.
Authorized officer Beate Giffo-Schmitt, International Preliminary Report on Patentability in PCT/US2007/075618, mailed Feb. 19, 2009, 6 pages.

* cited by examiner

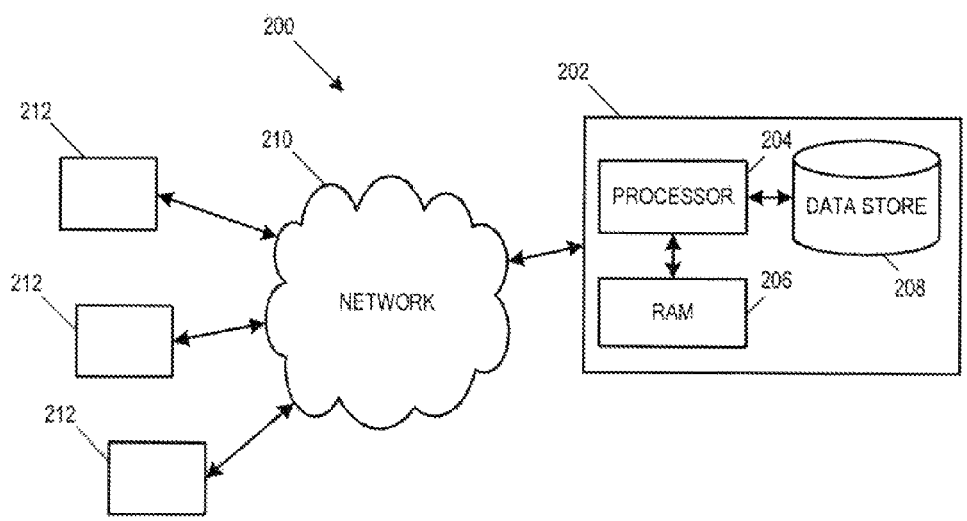
FIG. 2
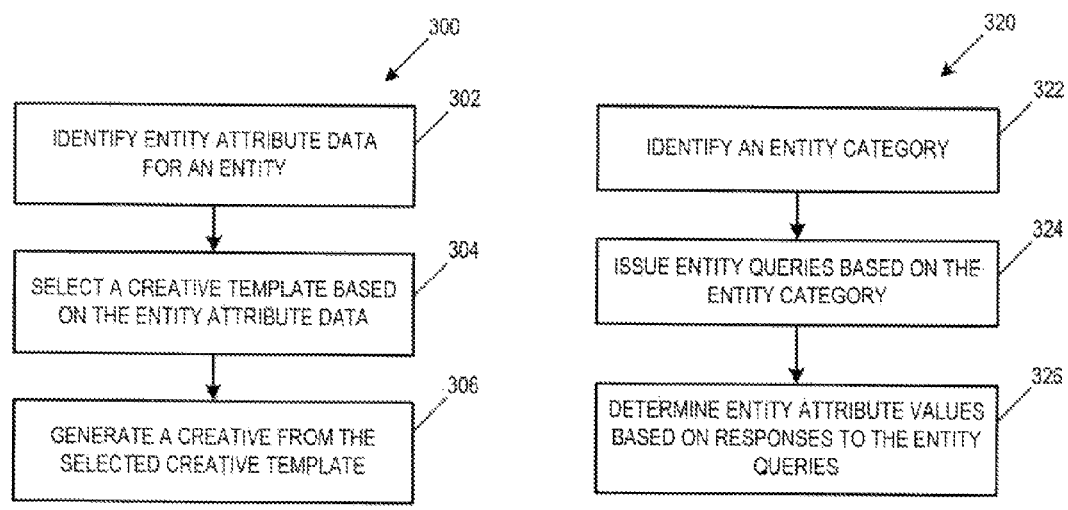
FIG. 3
FIG. 4

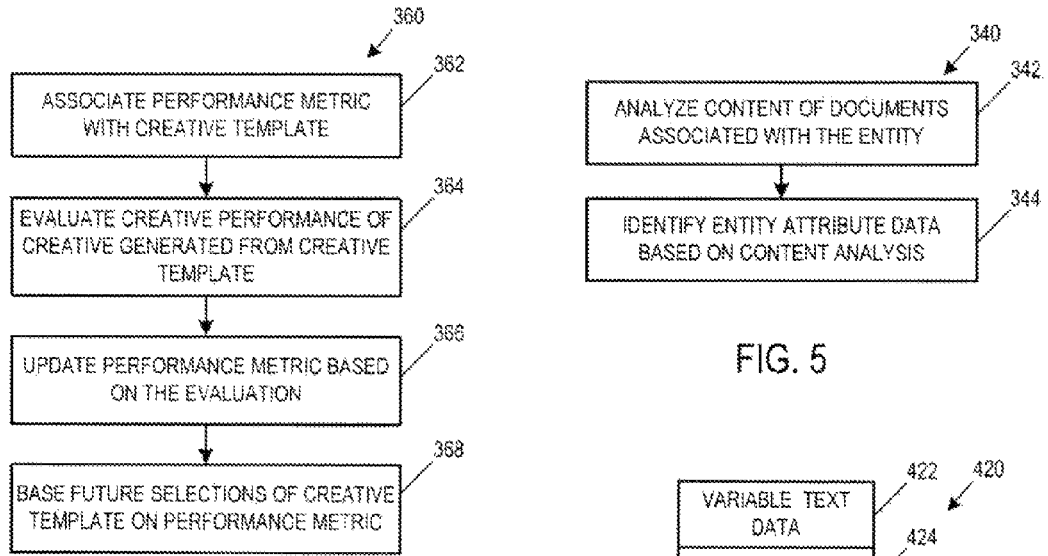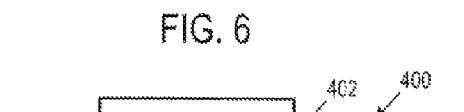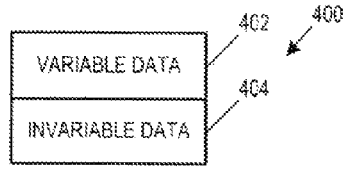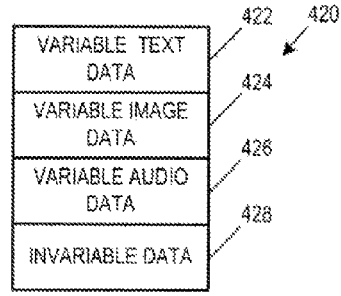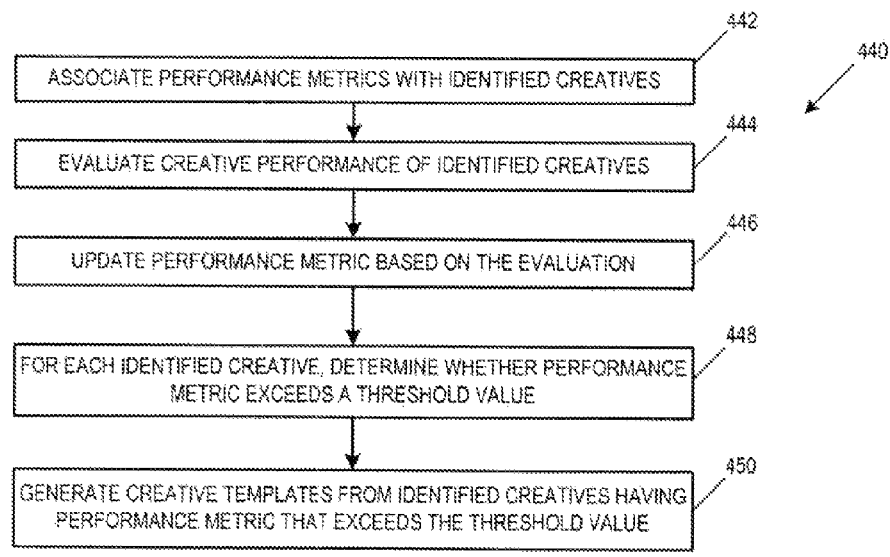

SYSTEM AND METHOD FOR GENERATING CREATIVES

FIELD

The system and methods described herein generally related to advertising systems.

BACKGROUND

An advertisement for a business or other entity may include a "creative" that includes text graphics and/or audio associated with the advertised service or product. This ad content of the creative is rendered or presented to an end user. The creatives may be published or disseminated through different media, such as radio, television, printed media, and the Internet. A very popular way of publishing a creative is through on-line advertising. For example, one or more creatives can be included in a content page that is delivered to a user through a browser. One specific example of such delivery can be in conjunction with the use of one or more tools, such as a search engine. Search engines, such as Google Web Search, may advertise various services and product when providing search results to a user. The advertisement typically are creatives associated with services or products that are relevant to the user's search. The creatives are often displayed in a delimited area of a web browser, such as to the side or along the top or bottom of the web browser window.

Generated creatives can be a daunting task, especially for the novice advertiser. The novice advertiser typically does not posses the skills and data to generate optimal creatives that may result in high click-through and conversion rates.

SUMMARY

Disclosed herein are system and methods for generating creatives. Attribute data regarding an entity, such as business entity, are identified. Thereafter, one or more creative templates are selected based on the attribute data related to the entity. Creatives for the entity are then generated from the creative templates and the entity attribute data.

In one aspect, a system is provided for generating creatives by identifying entity attribute data for an entity, selecting a creative template based on the entity attribute data, and generating a creative from the creative template and the entity attribute data.

In another aspect, a method for generating creatives includes determining an entity category, generating entity queries based on the entity category, determining entity characteristics based on responses to the entity queries, selecting a creative template based on the entity characteristics, and generating a creative from the creative template and entity characteristics.

In another aspect, a system for generating creatives includes a processing device and a data store. The data store stores attribute set data defining sets, attribute category data that associates categories with attribute sets, creative template data that defines creative templates, and program instructions. The processing device, upon executing the program instructions, cause the system to identify a corresponding category for an entity, access the category data and issue queries based on the association of attribute sets with the category, store the responses to the entity queries in entity campaign data, select a creative template based on the entity campaign data, and generate a creative form the creative template based on the entity campaign data.

The systems and methods disclosed herein facilitate the generation of creatives based on the attributes of an entity, and thus simplify the process of generating creatives, especially for the novice advertiser. Additionally, the creative templates may be based on creatives that have high performance rates, such as high conversion rates or click-through rates, thus increasing the likelihood that the creatives based on the creative templates may also have high performance rates. Also, the performance of the creatives generated by creative templates may be monitored so that creative template that produce creatives having high performance rates are selected more often, and those that produce creatives having low performance rates are selected less often.

The above aspects and advantages may be separately realized by one or more of the example implementations described below.

BRIEF DESCRIPTION OF THE DRAWINGS

FIG. 2A is an example system in which the system and methods disclosed herein may be implemented.

FIG. 3 is an example process for generating a creative from a creative template.

FIG. 4 is an example process for identifying entity attribute data.

FIG. 5 is another example process for identifying entity attribute data.

FIG. 6 is an example process for evaluating the performance of creatives generated from a creative template.

FIG. 7 is a block diagram of an example creative template.

FIG. 8 is a block diagram of another example creative template.

FIG. 9 is an example process for generating creative templates from an identified set of creatives.

DETAILED DESCRIPTION

Figure 1A:
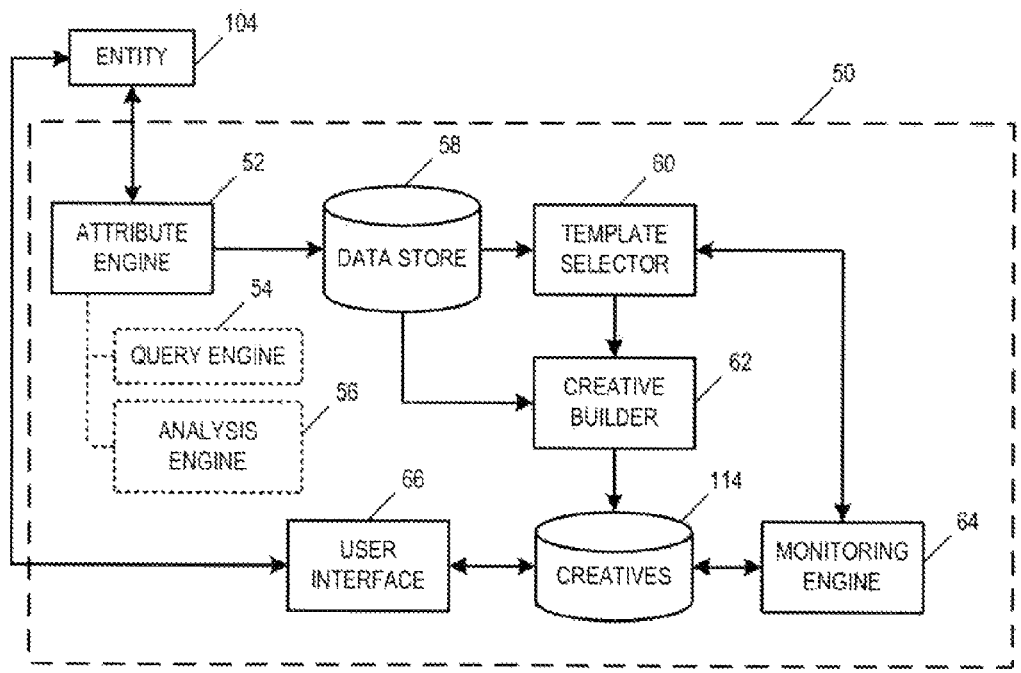
FIG. 1A is a block diagram of a creative generator system
Figure 1B:
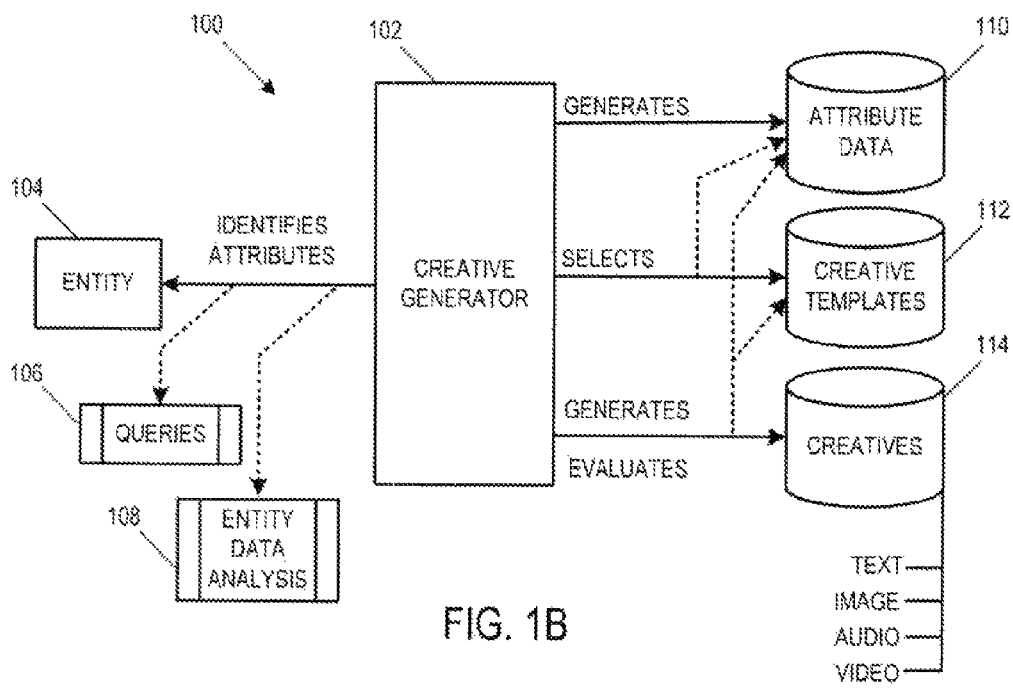
FIG. 1B is an entity relationship diagram for an example creative generator system and method.

FIG. 1A is a block diagram of a creative generator system 50, and FIG. 1B is an entity relationship diagram 100 for the example creative generator system 50 shown in FIG. 1A. A creative generator 102 identifies the attributes of an entity 104, e.g., using an attribute engine 52. The entity 104 may be a business entity, an individual or other type of entity. The attributes of the entity 104 may relate to the kind of business in which the entity 104 is engaged, e.g., consulting, engineering, etc., the products or services the entity 104 offers, etc.

In one implementation, the attributes of the entity 104 are identified by issuing queries 106 to the entity 104. A query engine 54, for example, may be used to issue the queries 106. The queries 106 may include a default set of questions. In a different implementation, the queries 104 may include a variable set of questions that are dependent on the responses provided by the entity 104. For example, a first query may request the entity 104 to select a business category, such as a business vertical, e.g., Legal, Engineering, Software, etc. Additional queries 106 may then depend on the business category selected, and may further depend on the responses to the queries 106. For example, if the creative generator 102 determines that the entity 104 is an on-line software retailer from responses to the first several questions, then the remaining queries 106 may be directed to sales, products, return policies, etc.

The queries 106 may include questions that require one response, many responses, or a textual response from the entity 104. For example, a question having one response may be a question that requires the entity 104 to select one business vertical; a question having many responses may be a question that requires the entity 104 to select one or more products or services offered by the entity 104; and a question that requires a textual response may be a question that requires the entity 104 to type in a business name.

In a different implementation, the attributes of the entity 104 are identified by an entity data analysis process 108. A analysis engine 56, for example, may be used to perform the data analysis process 108. The entity data analysis process 108 may include analyzing content of documents associated with the entity 104, and identifying the entity attributes based on the content analysis. The documents may be machine-readable and machine-storable documents, such as web pages, word processing files, and the like. The documents may be provided by the entity 104 or may be provided by third parties. For example, the creative generator 102 may determine the business vertical of the entity 104 by accessing directory listing data provided by a third party, and may determine additional attributes by searching documents provided or published by the entity 104.

The creative generator 102 generates attribute data 110 for the entity 104 and stores the attribute data 110 in a data, e.g., a data store 58. One or more creative templates 112 are selected based on the attribute data 110, as indicated by the single dashed arrow in FIG. 1B, and as implemented in an example template selector 60 in FIG. 1A. One or more creatives 114 are then created form the creative templates 112 and the attribute data 110, as indicated by branched dashed arrows in FIG. 1B, and as implemented in an example creative builder 62 in FIG. 1A. For example, a selected creative template 112 may be as follows:

---
{BusinessName}
Get information about {TypeOfLawFirm} law.
{Traits} lawyers fighting for you.

---

In the example creative template above, attribute variables are surrounded by the braces. The attribute variables are replaced with the corresponding attribute values stored in the attribute data 110 to generate a creative 114. Thus, the following creative 114 may be generated from the creative template 112, and the attribute data 110:

---
Smith Law Firm
Get information about Bankruptcy law.
Aggressive lawyers fighting for you.

---

The example creative 114 shown above includes text data. Creatives 114 may also include other data, including image data, such as still images or video clips, and audio data, such as music or speech. The other data may also include a link to an advertisement "landing document" that contain further details about the advertised product or service. The link may be embedded in the creative 114 or may be appended to the creative 114 as a separate link.

The selection of creative templates 112 may be limited based on the category of the entity 104 and other attribute data 110. For example, a first set of creative templates 112 may be eligible for selection for on-line booksellers, while a second set of creative templates 112 may be eligible for selection for realtors. Creative templates 112 may be common to two or more sets of creative templates, e.g., a particular creative template 112 may be used for both on-line booksellers and realtors. Alternatively, creative templates 112 may be limited to a single set of creative templates, e.g., a particular creative template 112 may be used only for realtors. Selection of the corresponding creative templates 112 may be likewise dependent on particular attribute data 110, e.g., a particular creative template may be used only for real estate agents having listing in a particular county.

In one implementation, creative templates 112 may be generated form persons that are skilled in designing creatives. For example, persons with advertising experience may generate the creative template 112 that are used to generate the creatives 114.

In another implementation, the creative templates 112 may be generated based on performance analysis of existing creatives 114. For example, the click-through rates and conversion rates of existing creatives 114 may be analyzed and the creatives 112 having click-through rates and conversion rates that exceed a threshold may be used to generate one or more creative templates 114. A "click-through" occurs when a user selects or "clicks" on an ad on a web page. The click-through rate is a performance metric that is obtained by dividing the number of users who clicked on the creative or link associated with the creative by the number of times the creatives was delivered. For example, if a creative is delivered 100 times, and three persons clicked on the creative, then the click-through rate for that creative is 3%.

A "conversion" occurs when a user consummates a transaction related to a previously served creative. What constitutes a conversion may vary from case to case and can be determined in a variety of ways. For example, a conversion may occur when a user clicks on a creative, is referred to the advertiser's Web page, and consummates a purchase there before leaving than Web page. Alternatively, a conversion may be defined as a user being shown an creative, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, dialing a telephone number, sending a product or service inquiry, etc. Often, if user action don't indicate a consummated purchase, they may indicate a sales lead, although user actions constituting a conversion are not limited to this. Indeed, many other definitions of what constitutes a conversion are possible.

The conversion rate may be defined as the ration of the number of conversions to the number of impressions of the creative (i.e., the number of times an creative is rendered) or the ratio of the number of conversions to the number of selections (or the number of some other earlier event). The type of conversion rate will be apparent from the context in which it is used. If a conversion is defined to be able to occur within a predetermined time since the serving of a creative, one possible definition of the conversion rate might only consider creatives that have been served more than the predetermined time in the past.

In the implementation in which the creative templates 112 are generated based on performance analysis of existing creatives 114, the creative templates 112 may be further evaluated to ensure that the resulting creatives are distinct from the existing creatives 114. In a variation of this implementation, the existing creatives 114 may include creatives authored by one or more entities 104. One evaluation technique includes determining an edit distance between the resulting creative and the existing creatives 114. For example, the resulting creative may be required to have a minimum number of keystroke differences from the existing creatives 114, and/or a minimum number of line differences from existing creatives 114. Such evaluations facilitate diversity in the creatives, and also ensures that creatives generative from the resulting creative templates 112 not inadvertent copies of existing creatives 114.

After a creative 114 is generated, its performance may be monitored, and the creative template 112, that generated the creative may be evaluated, for example by a monitoring engine 64. Further selection of the creative template 112 may be based on the evaluation. In one example implementation, a performance metric is associated with the creative template 112, and the performance of the creative 114 created from the creative template 112 is measured by the monitoring engine 64. The performance metric may be stored in the data store 58 and is updated based on the evaluation, and further selection of the creative template 112 may be based in part on the performance metric. The performance metric may be a click-through rate, a conversion rate, or other performance measurement.

In another implementation, further monitoring of the creative templates 112 may be performed to ensure diversity of the creatives 114 that are generated. The diversity may be based on frequency of use and/or an entity frequency. Diversity based on frequency of use ensures that different creative templates 112 are selected according to a frequency determination. One example process for obtaining diversity based on frequency of use is to limit the use of a creative template 112 to a maximum percentage rate of creative generations. For example, if a creative template 112 is limited to a 0.5% rate of creative generations, the creative template 112 will be used no more than once for over 200 creatives generated. Other processes to ensure diversity based on frequency of use may also be used, such as ensuring that the same creative is not generated at an ad-serving time to prevent the same creatives being rendered in the same frame on a web page.

Diversity based on entity frequency ensures that different creative templates 112 are used to generate creatives 114 on a per-entity basis. One example process for obtaining diversity based on entity frequency is to limit the use of a creative template 112 to a maximum percentage rate of creative generations for an entity. For example, if a creative template 112 is limited to a 10% rate of creative generations for an entity, the creative template 112 will be used no more than once for every 10 creatives generated. Other processes to ensure diversity based on entity frequency may also be used. Additionally, other creative diversity schemes may also be used.

In another implementation, the creatives 114 are presented to the entity 104 for approval, modification, or rejection. The presentation and entity 104 input may be facilitated by a user interface 66. The creative templates 112 may also be further evaluated on approval rates and modification rates, and the performance of creatives 114 that are modified by an entity 104 may be evaluated as described above. Based on the evaluation, the modified creative 114 may be used to generate a new creative template 112.

The creative template 112 may be used to generate creatives 114 for different entities. In one implementation, the entity 104 is presented with an option for exclusive use of a creative 114 generated by a creative template 112. If the entity 104 exercises the option for exclusive use of the creative 114, then selection of the creative template 112 to generate creatives 114 for other entities is precluded. The exclusive use may be for a limited time period, e.g., a license period. Alternatively, the exclusive use may be permanent via a purchase of the creative 114 or the creative template 112.

FIG. 2 is an example system 200 in which the systems and methods disclosed herein may be implemented. The system includes a server device 202, a network 210, and multiple client device 212. The server device 202 may include a processor 204 coupled to a computer readable memory 206, such as a RAM or other data store. The server device 202 may also include another data store 208, such as a database. The server device 202 may include program instructions executable by the processor 204 to implement the creative generator 102. Attribute data 110, creative template 112 and creatives 114 may be stored in the memory 206 and data store 208. Although depicted as a single computer system, the server device 202 may be implemented as a network of computers.

The server device 202 communicates with the client 212 via the network 210. The network 210 may be a local area network (LAN) or a wide area network (WAN), such as the Internet. Each client device 212 may be associated with an entity 104, and may comprise a device capable of communicating over the network 210, such as a computer, a mobile communication device, or other communication device. An entity 104 may provide response to queries and documents to the server device 202 via the client device 212.

FIG. 3 is an example process 300 for generating a creative from a creative template. Stage 302 identifies entity attribute data for an entity. The entity attribute data may be generated based on responses to queries provided to the entity (e.g., by the query engine 54) or by analyzing documents form the entity or third parties (e.g., by the analysis engine 56).

Stage 304 selects a creative template based on the entity attribute data (e.g., by the template selector 60). The selection of the creative template may be based on the category of the entity and other attribute data. The section may be further based on the performance of creatives generated by the creative template (e.g., as determined by the monitoring engine 64).

Stage 306 generates a creative from the selected creative template (e.g., by the creative builder 62). The creative may include text data, image data, and audio data. The creative may also include attribute values form the attribute data.

FIG. 4 is an example process 320 for determining entity attribute data as implemented, for example, by the example attribute engine 52 utilizing the query engine 54 and the analysis engine 56. Stage 322 identifies an entity category. The category may be identified from a response to a query (e.g., by using the attribute engine 52), or by analyzing documents provided by the entity or by a third party (e.g., by using the analysis engine 54).

Stage 324 issues entity queries based on the entity category (e.g., using the query engine 54). In one implementation, the entity queries comprise a default set of questions for the particular category. In a different implementation, the entity queries comprise a variable set of questions for the particular category, with each subsequent question being dependent on the responses to previous entity queries.

Stage 326 determines the entity attribute values based on the responses to the entity queries (e.g., using the attribute engine 52). The entity queries may include questions that require one response, many responses, or a textual response from the entity. Each response is stored as an attribute value.

FIG. 5 is another example process 340 for identifying entity attribute data. Stage 342 analyzes the content of documents associated with the entity (e.g., using the analysis engine 56). The documents may be provided by the entity or by a third party.

Stage 344 identifies the entity attributes based on the content analysis. For example, analysis of the documents may reveal that the entity provides on-line conferencing services, and specializes in video conferencing. The corresponding entity attribute values for the entity may be stored in the data entity attribute data stored in the data store 58.

FIG. 6 is an example process 360 for evaluating the performance of creatives generated from a creative template. The example process 360 may be implemented, for example, in the monitoring engine 64. Stage 362 associates a performance metric with the creative template. The performance metric may be a click-through rate, a conversion rate, or some other metric.

State 364 evaluates the performance of the creative created from the creative template. The evaluation is based on the performance metric. For example, if the performance metric is a click-through rate, then the click-through rate of the creative is evaluated.

Stage 366 updates the performance metric based on the evaluation, and stage 368 bases future selection of the creative template on the performance metric. For example, if the click-through rate is very high, then the creative template may be selected more frequently (e.g., by the template selector 60); conversely, if the click-through rate is very low, then the creative template may be selected less frequently or even discarded.

In a different implementation, multiple performance metrics may be associated with different business categories to evaluate the creative template for use in different categories. For example, a particular creative template may produce creatives with high click-through rates for on-line software retailers, but may produce creatives with very low click-through rates for pet supply retailers. Accordingly, the creative template may be selected with greater frequency for on-line software retailers, and may be selected with less frequency, or even be precluded from selection, for pet supply retailers.

FIG. 7 is a block diagram of an example creative template 400. The creative template 400 may include variable data 402 and invariable data 404. The variable data 402 may replaced by a corresponding attributed value. For example, in the following creative template, the variable data 402 is delimited by brackets, and the invariable data 404 is the remaining text data:

---
{BusinessName}
Get information about {TypeOfLawFirm} law.
{Traits} lawyers fighting for you.
---

The creative template 400 may be generated from persons that are skilled in designing creatives or based on a performance analysis of existing creatives.

While the above example creative template includes text data, the creative template may also include image data and/or audio data. FIG. 8 is a block diagram of another example creative template 420 that includes variable text data 422, variable image data 424, and variable audio data 426. The creative template 420 may be used to generate a creative having an image from the {BusinessImage} variable image data 424, such as business logo, and audio from the {ServiceMarkAudio} variable audio data 426, such as a tag line:

---
{BusinessImage}
Get information about {TypeOfLawFirm} law.
{Traits} lawyers fighting for you. {ServiceMarkAudio}
---

In a different implementation, the creative template 400 include only invariable data 404. In another implementation, inclusion of variable data 402 may depend on the entity attribute data. For example, in the creative template above, the {BusinessImage} variable image data 424 may be excluded from the creative generated from the creative template for an entity if there is no image attribute data for the entity.

In another implementation, the creative template 400 may be used to generate creatives for delivery over other media, such as radio or print. The variable data 402 may also specify audio, text, or image characteristics, such as presentation characteristics. For example, the creative generated from the creative template 400 may be delivered as an advertisement read over a radio broadcast, and the variable data 401 may specify the gender of the person that is to read the creative. Likewise, the creative generated from the creative template 400 may include text that is to be published via a web page or in print media, and the variable data 402 may specify first font characteristics for the web page publication and second font characteristics for the print media publications. Similarly, the creative generated from the creative template 400 may include an image that is to be published via a web page, and the variable data may specify a frame size for a border around the image.

FIG. 9 is an example process 440 for generating creative templates form an identified set of creatives. The example process 440 may be used to generate creative templates 112 for an entity 104 that already has set of identified creatives. For example, an entity 104 may have developed its own creatives over a period of many years, and thus may have thousands of creatives. By evaluating the performance of the creatives, the example process 440 may generate creative templates for further generation of creatives for the entity 104.

Stage 442 associates performance metrics with identified creatives. The identified creatives may be creatives authored by the entity 104 and associated with the entity.

Stage 444 evaluates creative performance of the identified creative. The evaluations may be performed as described above, e.g., the measuring of click-through rates, conversions, etc.

Stage 446 updates the performance metric based on the evaluation, and stage 448 determines whether a performance metric for identified creative exceeds a threshold value, Those creatives that have an associated performance metric that exceed a threshold value may be used to generate creative templates, as shown in stage 450.

The generation of the creative templates may be based on one or more characteristics of the creatives having a performance metric that exceed a threshold value. For example, the creative templates may be based on the use of capitalization of particular letters in the creatives. Likewise, the creative templates may be based on particular phrases that are found to be common to many of the creatives whose performance exceeds the threshold. Also, the creative templates may be based on particular alliterations that are found to be common to the many of the creatives whose performance exceeds the threshold. Other processes of generating the creative templates 112 may also be used.

These creative templates 112 may then be used to generate creative only for the entity 104. Alternatively, the creative template may ne licensed or sold to third parties.

Figure 10:
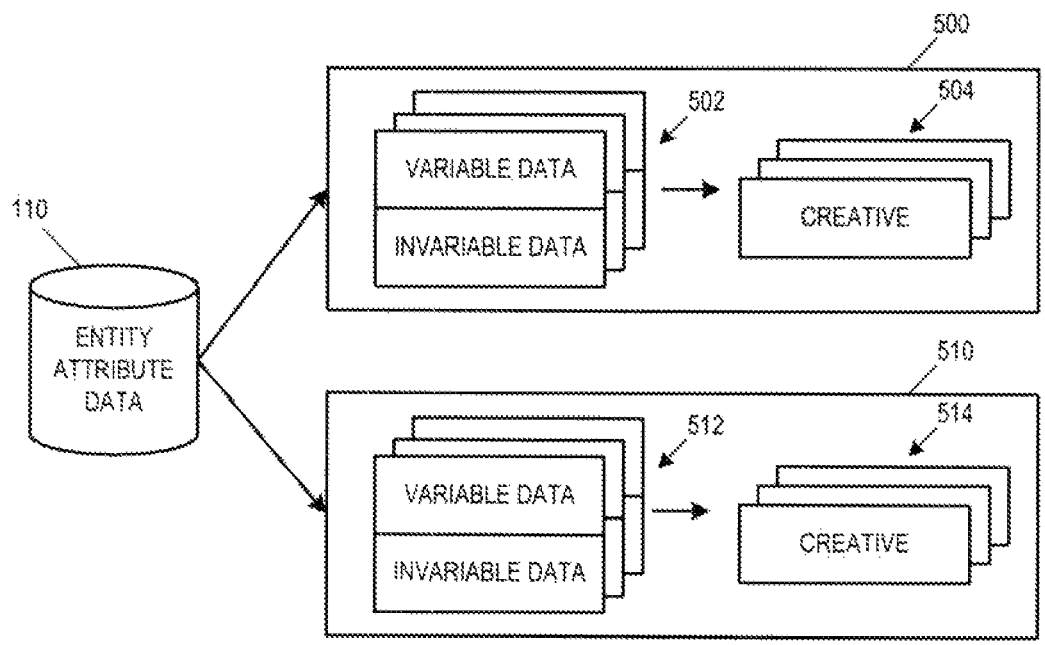
FIG. 10 is a block diagram of example sets of creatives for separate advertisement campaigns.

FIG. 10 is a block diagram of example sets of creatives for separate advertisement campaigns 500 and 502. Attribute values for an entity 104 may be stored in the entity attribute data 110 as a campaign. The campaign may encompass all of the advertisements for the entity 104, or may instead encompass advertisement for separate campaigns. For example, a car dealership entity 104 may have a first campaign 500 directed to a particular brand of automobiles. Thus, a first set of creative templates 500 may be used to generate a first set of creative 504 for the particular automobile brand. The car dealership entity 104, however, may have a second campaign 510 directed to a seasonal sale. Accordingly, a second set of creative templates 512 may be used to generate a second set of creatives 514 for the seasonal sale.

Figure 11:
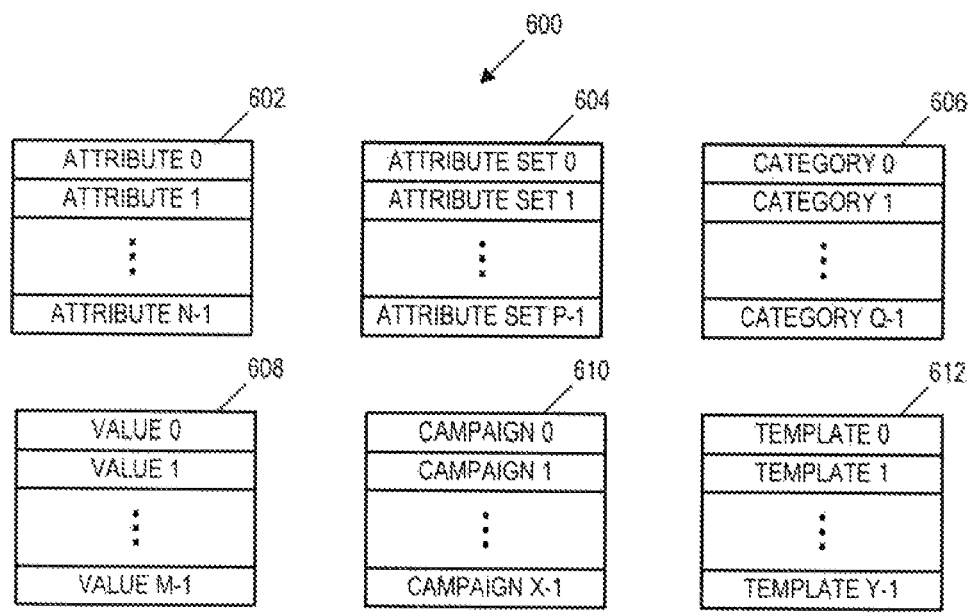
FIG. 11 is an example database structure for implementing a system for generating creatives.

FIG. 11 is an example database structure 600 for implementing a system for generating creatives. An attributes table 602 stores N attributes associated with the entities. Example attributes are Business Name, Business Type. Offers Free Shipping, etc. These attributes are referenced by the variable data in the creative templates. The attributes can be common to most entities, but may also be specific to certain entity categories. Table 1 below shows an example attribute record in the attribute table 602.

TABLE 1

| Field | Value |
| --- | --- |
| AttributeID | 3421 |
| MarkupPlaceHolder | TypeOfLawFirm |
| Name | Type of law firm |
| Prompt | What kind(s) of law does your firm practice? |
| Description | The kind(s) of law that your firm practices. Choose the most specific kind(s) applicable. |
| ValueType | ManyOfMany |

The AttributeID field stores an attribute identifier. The MarkupPlaceHolder field corresponds to the variable data used in the creative template as a placeholder for where an attribute value is inserted to generate a creative. The Name field stores a textual label that is displayed to an entity to review the attribute value. The Prompt field stores the query posed to the entity to elicit a response indicating the attribute value. The Description field stores a clarifying description that can be displayed to the entity, such as during a mouse over. The Value Type field indicates the value the attribute may have.

Example ValueTypes include OneOfMany, ManyOfMany, or TextEntry. OneOfMany refers to attributes in which the entity may select only value from a set of values. These value types may be implemented as radio buttons or drop-down menu selections. ManyOfMany refers to attributes in which the entity may select more than one value from a set of values. These value types may be implemented as a group of checkboxes or a multi-select list. TextEntry refers to attributes that have no pre-determined options, and require the entity to type in a value.

An attribute set table 604 stores P attribute sets. In the example database structure 600, each attribute 0 . . . N–1 is a member of at least one attribute set 0 . . . P–1. The attribute sets may be used for various groupings, such as intrinsic attributes, category attributes, etc. An example set of intrinsic attributes would include a Business Name attribute, a Business Address attribute, and other attributes that are intrinsic to most entities. An example set of category attributes would be a set of Legal attributes, such as Types of Law, Bar Memberships, and other attributes that would typically be only application to legal practitioners.

A category table 606 stores Q category sets. The category sets define the relationships between attribute sets and categories. Once an entity selects a category, questions may be presented to the entity based on the related attribute sets. For example, if an entity is a law firm entity, then queries related to the intrinsic attribute set and the attribute set would be presented to the entity.

A value options table 608 stores M attribute value options for the N attributes. An attribute value option is a potential value the entity may choose for an attribute. Table 2 below shows an example value options record in the options table 608.

TABLE 2

| Field | Value |
| --- | --- |
| ValueOptionID | 2314 |
| AttributeID | 3421 |
| Prompt | Criminal |
| MarkupPlaceHolderSubstitutionText | Criminal Law |

The ValueOptionID field stores an identifier for the attribute value option. The AttributeID field stores the attribute that the value option is associated with. In this example, the value is 3421, which corresponds to the TypeOfLawFirm attribute shown in Table 1. The Prompt field stores the text displayed to the entity to elicit a response indicating the attribute value. The MarkupPlaceHolderSubstitutionText stores the text that is inserted in place of the MarkupPlaceHolder in the creative template. In this example, the text "Criminal Law" would be inserted for the place holder "TypeOfLawFirm".

While only one example value option record is shown, there may be multiple value option records corresponding to an attribute, depending on the ValueType of the corresponding attribute. For example, the value option in Table 2 above may be one many attribute value options for attribute "TypeOfLaw," e.g., Bankruptcy Law, Criminal Law, Family Law, etc.

A campaign table 612 stores X actual values chosen or entered by the entity for each application attribute. Thus the campaign table 610 stores a data set that is specific to the entity.

A creative template table 610 stores Y creative template. The creative templates may be selected based on responses to attribute queries as indicated in the campaign table 612. An example creative template is shown in Table 3 below.

TABLE 3

| Field | Value |
| --- | --- |
| CreativeTemplateID | 9788 |
| Status | Active |
| Markup | {BusinessName}<br>Get information about {TypeOfLawFirm} law.<br>{Traits} lawyers fighting for you. |

The CreativeTemplateID field stores the identifier for the creative template. The Field stores the current status of the creative template. Example status values are Proposed Experimental, Active, and Inactive. A Proposed status is a status that may be assigned to a creative template that has yet to be evaluated. An Experimental status is a status that may be assigned to a creative template for initial evaluation of performance. An active status is a status that may be assigned to a creative template if the creative template has a successful evaluation. An Inactive status is status that may be assigned to creative template if the creative template is not to be selected. Additional status categories may also be used, e.g., Exclusively Licensed, Sold, etc.

Additional table may also used in the example database structure 610. For example, table may be used to store creatives generated by the creative templates, evaluation metrics corresponding to the creatives, country codes, language codes, and the like.

Figure 12:
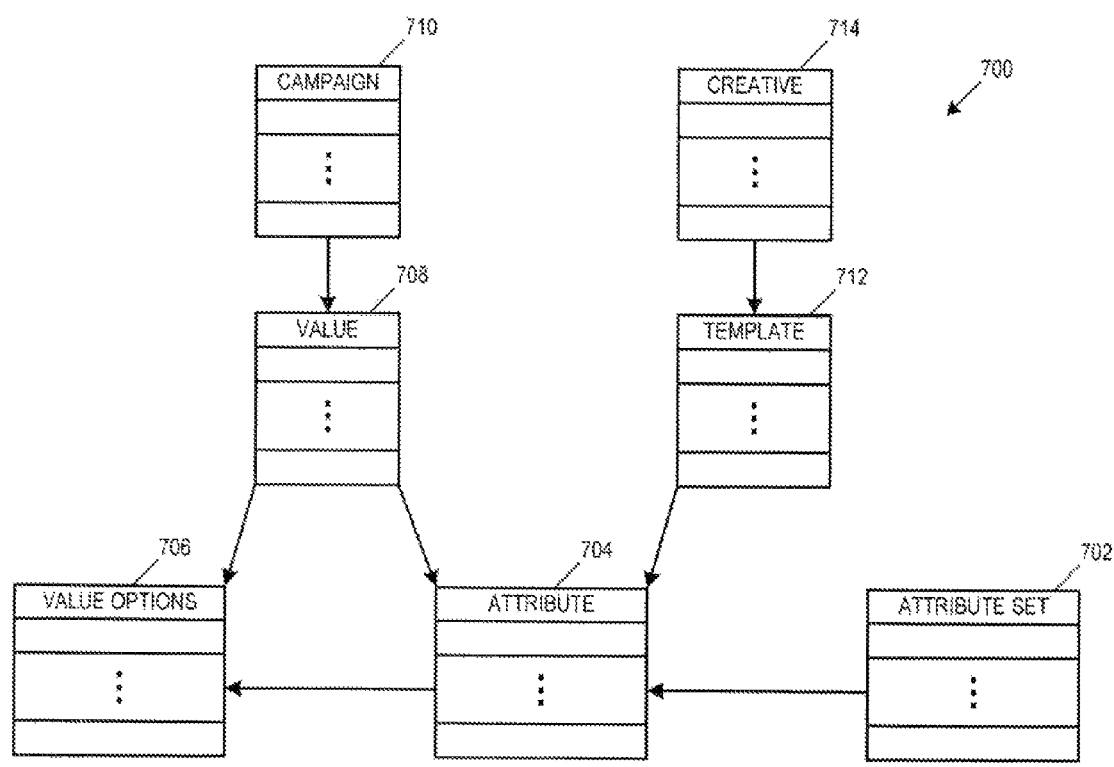
FIG. 12 is an example domain model for generating creatives.

FIG. 12 is an example domain model 700 for generating creatives. In this example domain model, an attribute set 702 determines the attributes 704 for which an entity may be queried or examined. The attributes 704, in turn, determine which attribute value 708 define one or more campaigns 710. Creative templates 712 are likewise selected based at least on the attributes 704 to generate creatives 714. The creatives 714 incorporate the attribute value 708 as defined by the campaigns 710.

The apparatus, methods, flow diagrams, and structure block diagrams described in this patent document may be implemented in computer processing system including program code comprising program instruction that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalent thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the example set forth above, those of ordinary skill in the art may effect alterations, modifications and variations to the examples without departing from the scope of the invention.

What is claimed is:

1. A computer-implemented method for generating creatives, comprising:
 identifying entity attribute data for a plurality of entities, wherein each of the plurality of entities is an advertiser, the identifying entity attributes comprising, for each advertiser:
  providing a first question requesting the advertiser to select a business vertical of the advertiser;
  issuing additional questions based on the business vertical selected in response to the first question, the additional questions being questions that correspond to the business vertical selected; and
  determining entity attribute values for the advertiser based on responses to the first question and the additional questions from a user associated with the advertiser;
 selecting a creative template from a plurality of creative templates, each of the creative templates being eligible for selection for the plurality of advertisers, the selection being based on:
  the entity attribute data for the advertiser; and
  a diversity frequency associated with each creative template to limit use of the creative template to a maximum percentage rate of creative generations; and
 generating a creative from the creative template and the entity attribute data.

2. The method of claim 1, wherein selecting a creative template from a plurality of creative templates based on the entity attribute data comprises:
 selecting the creative template from the plurality of creative templates based on the entity attribute values.

3. The method of claim 1, further comprising:
 for each business vertical for which a creative template is selected for a plurality of advertisers:
  associating a performance metric with the creative template for the business vertical;
  evaluating a performance of the creative generated from the creative template, the performance metric evaluated only on the performance of the creative for the business vertical;
  updating the performance metric based on the evaluation and
  selecting the creative template based on the performance metric for the business vertical that matches the business vertical selected in response to the first question.

4. The method of claim 3, wherein selecting the creative template based on the performance metric comprises:
 increasing or decreasing a selection frequency of the creative template for the business vertical based on the value of the performance metric for the business vertical.

5. The method of claim 1, wherein identifying entity attribute data for a plurality of entities comprises:
 analyzing content of documents associated with at least one of the plurality of entities; and
 identifying the entity attribute data based on the content analysis.

6. The method of claim 1, further comprising:
 selecting variable creative data for a creative template, the variable creative data specifying attributes for insertion of variable attribute values in a creative generated from the creative template;
 selecting invariable creative data for the creative template, the invariable creative data being date that is included in each creative generated from the creative template; and
 storing the variable creative data and invariable creative data as another creative template in the plurality of creative templates.

7. The method of claim 6, wherein the variable creative data and invariable creative data comprise one or more of voice data, image data, or text data.

8. The method of claim 7, wherein the variable creative data specifies a presentation characteristic.

9. The method of claim 6, further comprising:
 analyzing advertising content of documents associated with one or more entities; and
 generating the invariable creative data based on the advertising content analysis.

10. The method of claim 6, further comprising:
 analyzing the performance of existing creatives; and
 in response to determining that the performance of existing creatives exceeds a threshold:
  identifying a phrase common to the existing creatives having a performance that exceeds the threshold; and
  generating selecting the phrase as the invariable creative data. based on the analysis of the performance of the existing creatives.

11. The method of claim 1, wherein generating a creative from the creative template and the entity attribute data comprises:
   selecting variable creative data;
   selecting invariable creative data; and
   substituting entity attribute values based on the variable creative data.

12. The method of claim 1, further comprising:
   presenting an option for exclusive use of the creative to the advertiser.

13. The method of claim 1, wherein the diversity frequency limits the of the creative template to maximum percentage rate of creative generations of creatives generated for all advertisers.

14. A system for generating creatives, comprising:
   a processing device; and
   a data store storing:
      attribute set data defining attribute sets associated with a plurality of entities, wherein each of the plurality of entities is an advertiser;
      attribute category data associating categories with attribute sets;
      creative template data defining creative templates; and
      program instructions that upon execution by the processing device cause the system to:
      for each advertiser:
         provide a first question requesting the advertiser to select a business vertical of the advertiser;
         issue additional questions based on the business vertical selected in response to the first question, the additional questions being questions that correspond to the business vertical selected; and
         determine entity attribute values for the advertiser based on responses to the first question and the additional questions from a user associated with the advertiser;
         store the entity attribute values in entity campaign data for the advertiser;
         select a creative template from a plurality of creative templates, each of the creative templates in the plurality of creative templates being eligible for selection for the plurality of advertisers, the selection being based on:
            the entity campaign data for the advertiser; and
            a diversity frequency associated with each creative template to limit use of the creative template to a maximum percentage rate of creative generations; and
         generate a creative from the creative template based on the entity campaign data for the advertiser.

15. The system of claim 14, further comprising program instructions that upon execution by the processing device cause the system to:
   for each business vertical for which a creative template is selected for a plurality of advertisers:
      associate a performance metric with the creative template for the business vertical;
      evaluate the performance of the creative generated from the creative template, the performance metric evaluated only on the performance of the creative for the business vertical;
   update the performance metric based on the evaluation; and
   select the creative template from the plurality of creative templates based on the performance metric for the business vertical that matches the business vertical selected in response to the first question.

16. The system of claim 14, wherein the creative template data comprises:
   variable creative data for the creative template, the variable creative data specifying attributes for insertion of variable attribute values in a creative generated from the creative template;
   invariable creative data for the creative template, the invariable creative data being date that is included in each creative generated from the creative template; and
   wherein the variable creative data and invariable creative data comprise at least one of text data, image data, or audio data.

17. The system of claim 16, further comprising program instructions that upon execution by the processing device cause the system to:
   analyzing the performance of existing creatives;
   in response to determining that the performance of existing creatives exceeds a threshold:
      identifying a phrase common to the existing creatives having a performance that exceeds the threshold; and
      selecting the phrase as the invariable creative data.

18. The system of claim 14, wherein the diversity frequency limits the of the creative template to maximum percentage rate of creative generations of creatives generated for all advertisers.

19. Software stored on computer readable memory storage device comprising instructions executable by one or more computers and upon such execution cause the one or more computers to perform operations comprising:
   identifying entity attribute data for a plurality of entities, wherein each of the plurality of entities is an advertiser, the identifying entity attributes comprising, for each advertiser:
      providing a first question requesting the advertiser to select a business vertical of the advertiser;
         issuing additional questions based on the business vertical selected in response to the first question, the additional questions being questions that correspond to the business vertical selected; and
         determining entity attribute values for the advertiser based on responses to the first question and the additional questions from a user associated with the advertiser;
   for each entity:
   selecting a creative template from a plurality of creative templates, each of the creative templates being eligible for selection for the plurality of entity advertisers, the selection being based on:
      the entity attribute data for the advertiser; and
      a diversity frequency associated with each creative template to limit use of the creative template to a maximum percentage rate of creative generations; and
   generating a creative from the creative template and the entity attribute data.

20. The software of claim 19, wherein selecting a creative template from a plurality of creative templates based on the entity attribute data comprises:
   selecting the creative template from the plurality of creative templates based on the entity attribute values.

21. The software of claim 19, wherein the instructions cause the one or more computers to perform further operations comprising:
   for each business vertical for which a creative template is selected for a plurality of advertisers:
      associating a performance metric with the creative template for the business vertical;

evaluating a performance of the creative generated from the creative template, the performance metric evaluated only on the performance of the creative for the business vertical; and updating the performance metric based on the evaluation and selecting the creative template based on the performance metric for the business vertical that matches the business vertical selected in response to the first question.

22. The software of claim 19, wherein selecting the creative template based on the performance metric comprises:

increasing or decreasing a selection frequency of the creative template for the business vertical based on the value of the performance metric for the business vertical.

23. The software of claim 19, wherein identifying entity attribute data for a plurality of entities comprises:

analyzing content of documents associated with at least one of the plurality of entities; and identifying the entity attribute data based on the content analysis.

24. The software of claim 19, wherein the instructions cause the one or more computers to perform further operations comprising:

selecting variable creative data for a creative template, the variable creative data specifying attributes for insertion of variable attribute values in a creative generated from the creative template;

selecting invariable creative data for the creative template, the invariable creative data being date that is included in each creative generated from the creative template; and storing the variable creative data and invariable creative data as another creative template in the plurality of creative templates.

25. The software of claim 24, wherein the variable creative data and invariable creative data comprise one or more of voice data, image data, or text data.

26. The software of claim 24, wherein the variable creative data specifies a presentation characteristic.

27. The software of claim 24, wherein the instructions cause the one or more computers to perform further operations comprising:

analyzing advertising content of documents associated with one or more entities; and generating the invariable creative data based on the advertising content analysis.

28. The software of claim 24, wherein the instructions cause the one or more computers to perform further operations comprising:

analyzing the performance of existing creatives; and in response to determining that the performance of existing creatives exceeds a threshold:

identifying a phrase common to the existing creatives having a performance that exceeds the threshold; and generating selecting the phrase as the invariable creative data. based on the analysis of the performance of the existing creatives.

29. The software of claim 19, wherein generating a creative from the creative template and the entity attribute data comprises:

selecting variable creative data;

selecting invariable creative data; and substituting entity attribute values based on the variable creative data.

* * * * *